(12) United States Patent
Hughes

(10) Patent No.: US 6,859,044 B2
(45) Date of Patent: Feb. 22, 2005

(54) METHOD AND ARCHITECTURE FOR FAULT PROTECTION ON A BROADBAND COMMUNICATIONS NETWORK POWER PASSING TAP

(75) Inventor: Brent S. Hughes, Cumming, GA (US)

(73) Assignee: Arris International, Inc., Suwanee, GA (US)

( * ) Notice: Subject to any disclaimer, the term of this patent is extended or adjusted under 35 U.S.C. 154(b) by 47 days.

(21) Appl. No.: 10/171,029

(22) Filed: Jun. 12, 2002

(65) Prior Publication Data

US 2002/0196032 A1 Dec. 26, 2002

Related U.S. Application Data

(60) Provisional application No. 60/299,488, filed on Jun. 20, 2001.

(51) Int. Cl.[7] .......................... H01H 31/02; G01R 31/14
(52) U.S. Cl. ......................... 324/539; 324/500; 324/509
(58) Field of Search ................................ 324/530, 524, 324/525, 127, 500, 509, 520, 539, 534

(56) References Cited

U.S. PATENT DOCUMENTS 5,793,590 A   8/1998  Vokey et al. .................. 361/79
6,128,169 A * 10/2000  Neiger et al. ................. 361/42
6,608,741 B1 * 8/2003  Macbeth ....................... 361/42

* cited by examiner

*Primary Examiner*—N. Le
*Assistant Examiner*—John Teresinski
(74) *Attorney, Agent, or Firm*—John L. Doughty (57) ABSTRACT

A method and architecture that uses a ground-fault-circuit-interrupter ("GFCI") proximate the tap to provide fault protection along a Low Power Network drop cable. The solution is single-ended and effective regardless of the input, impedance and type of termination equipment, such as an NIU, connected thereto. The GFCI may be incorporated into a single enclosure that includes a power passing tap and filter device, such as a low pass filter and a splitter. Application will typically be in a CATV network employing center core powering or Siamese powering. Ground fault protection is provided to personnel that contact an energized conductor of the drop cable who would therefore otherwise become an electrical path between the energized conductor and ground. A device providing this protection is typically mounted along a network cable proximate a tap point reasonably is inaccessible, except to service personnel.

20 Claims, 4 Drawing Sheets

METHOD AND ARCHITECTURE FOR FAULT PROTECTION ON A BROADBAND COMMUNICATIONS NETWORK POWER PASSING TAP

CROSS REFERENCE TO RELATED APPLICATION

This application claims priority under 35 U.S.C. 119(e) to the benefit of the filing date of Hughes, U.S. provisional patent application No. 60/299,488 entitled "A Method And Architecture For Fault Protection On A Broadband Communications Network Power Passing Tap", which was filed Jun. 20, 2001, and is incorporated herein by reference.

FIELD OF INVENTION

This invention relates, generally, to powered broadband communication networks and, more particularly, to power-passing taps in such networks.

BACKGROUND OF THE INVENTION

Recent standards promulgated in National Electric Code ("NEC") Article 830—Network-Powered Broadband Communications Systems, list requirements that pertain to powered Broadband Communications Networks (i.e. CATV networks). The networks are classified in terms of Low, Medium and High Power. A powered "drop" from the "tap" on the hard-line coax to the NIU (Network Interface Unit) or any other CPE (customer premise equipment) is generally considered to meet the requirements of a Low Power Network. For example, Section 830-11(c) requires that underground drops be buried at least 18" deep and calls for mechanical protection (i.e. conduit) where the cable emerges from the ground. This requirement reportedly costs service providers well in excess of $100 to implement.

However, an exception to this requirement provides that Low Power circuits that are also equipped with a "listed fault protection device, appropriate to the network-powered broadband communications cable used" need not be buried, as long as the appropriate fault protection device is "located on the network side of the network-powered broadband communications cable being protected." Section 830-2 of the NEC defines, very generally, what a Fault Protection Device is. The main intention is to "provide [to humans or animals] acceptable protection from electric shock."

An existing system marketed as providing this protection comprises a two-device system with one device residing at the tap and the other at the NIU. The device works by generating a small DC offset voltage in the tap end. This voltage is passed through a known impedance at the NIU end device. An increase in impedance is seen as an open and a decrease in impedance is seen as a short on the drop. Both cases cause the tap end of the device to disconnect the power from the drop.

One drawback of this system is an inability to handle load transients placed on the network by the NIU. These transients appear as a near DC offset in current and cause the device to trip, thus disconnecting the power to the NIU. The manufacturer has attempted to overcome this problem by slowing the response of the device (increasing response time). However, as response time increases, personnel protection decreases because the energy of a fault transient is directly proportional to its period. Thus, to provide the greatest margin of safety, response times should be kept as short as possible.

Another device monitors the input impedance of the NIU. Deviations of the input impedance are interpreted as shorts or opens and cause the device to trip. However, this method does not account for the variation of the input impedance of the NIU power supply due to the variation in both the line voltage and the load placed on it by the NIU.

Further, assuming the above problem is overcome, a different device would probably be required for every type NIU to account for power supply and EMI filter differences.

Therefore, a need exists for a fault protection method and architecture that provide a fast response time and are effective for variable input impedance and type of NIU.

Furthermore, for literal compliance with NEC section 830, a need exists for a fault protection method and architecture that comprises a single device electrically and physically located on the network side of the cable being protected.

SUMMARY OF THE INVENTION

The present invention meets the aforementioned needs. A ground-fault circuit interrupter ("GFCI") circuit at the tap of a Low-Power-Network drop cable is used in a device to provide fault protection that is single-ended (comprises a device electrically and physically located at a single location); the device is effective regardless of the type and input impedance of an NIU or other termination equipment connected to it.

An aspect provides fault protection to a cable having at least two conductors for transmitting high frequency electrical signals and AC power simultaneously. For example, a coaxial cable carries an RF signal and an AC power signal on its center core, while the shield, which is the neutral in such a system, is also tied electrically to ground. Such a system is known in the art as a center-core powering scheme. The device comprises a means for interrupting the AC power transmitted in the conductors in response to a trigger signal outputted from a trigger means. The trigger means outputs the trigger signal in response to a fault signal, and causes the interrupting means to operate from a normally closed position to an open position. The trigger means is configured for receiving the fault signal at a sense input and further configured for outputting the trigger signal to the interrupting means from a trigger signal output. The sensing means is coupled to the AC conductors, which may be, for example, traces on a printed circuit, and senses a fault condition between a hot conductor and ground. When a fault is sensed by the sensing means, a fault signal propagates from an output of the sensing means to a sense input of the trigger means, the sense input of the trigger means being electrically connected to the output of the sensing means.

Another aspect provides fault protection to a cable having at least two conductors for transmitting AC power separately from a cable that transmits an RF signal, although the separate cables for transmitting AC power and RF signals are typically trained together. Such a system is known in the art as a composite, or Siamese, powering scheme. The device comprises a means for interrupting the AC power transmitted in the AC power conductors in response to a trigger signal outputted from a trigger means. The trigger means outputs the trigger signal in response to a fault signal, and causes the interrupting means to operate from a normally closed position to an open position. The trigger means is configured for receiving the fault signal at a sense input and further configured for outputting the trigger signal to the interrupting means from a trigger signal output. The sensing means, typically a transformer, for example, is inductively coupled to the AC power conductors, which may be, for example, traces on a printed circuit, and senses a fault condition between either of the at least two conductors ground. When a fault is sensed by the sensing means, a fault signal propagates from an output of the sensing means to a sense input of the trigger means, the sense input of the trigger means being electrically connected to the output of the sensing means. In addition, a voltage injection means, typically a transformer, for example, induces a common mode voltage on each conductor of the AC power cable with respect to ground. If a neutral-ground fault, i.e. a short between neutral and ground, for example, occurs, a net current will result in the AC power cable due to the common mode voltage. Thus, the sensing means can also detect a neutral ground fault in a Siamese powering scheme.

DETAILED DESCRIPTION OF THE INVENTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiment, it is to be understood that this disclosure is only illustrative and exemplary of the present invention and is made merely for the purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while much of the present invention is described in detail herein with respect to transformers, relays, cabling and circuit functions, no specific circuit component is required to be used in the practicing of the present invention. Indeed, it would be a matter of routine skill to select the configuration and values of, for example, connectors, resistors, capacitors, inductors, diodes, etc., and active components such as, for example, transistors and integrated circuit components in implementing the invention is a particular installation application.

Figure 1:
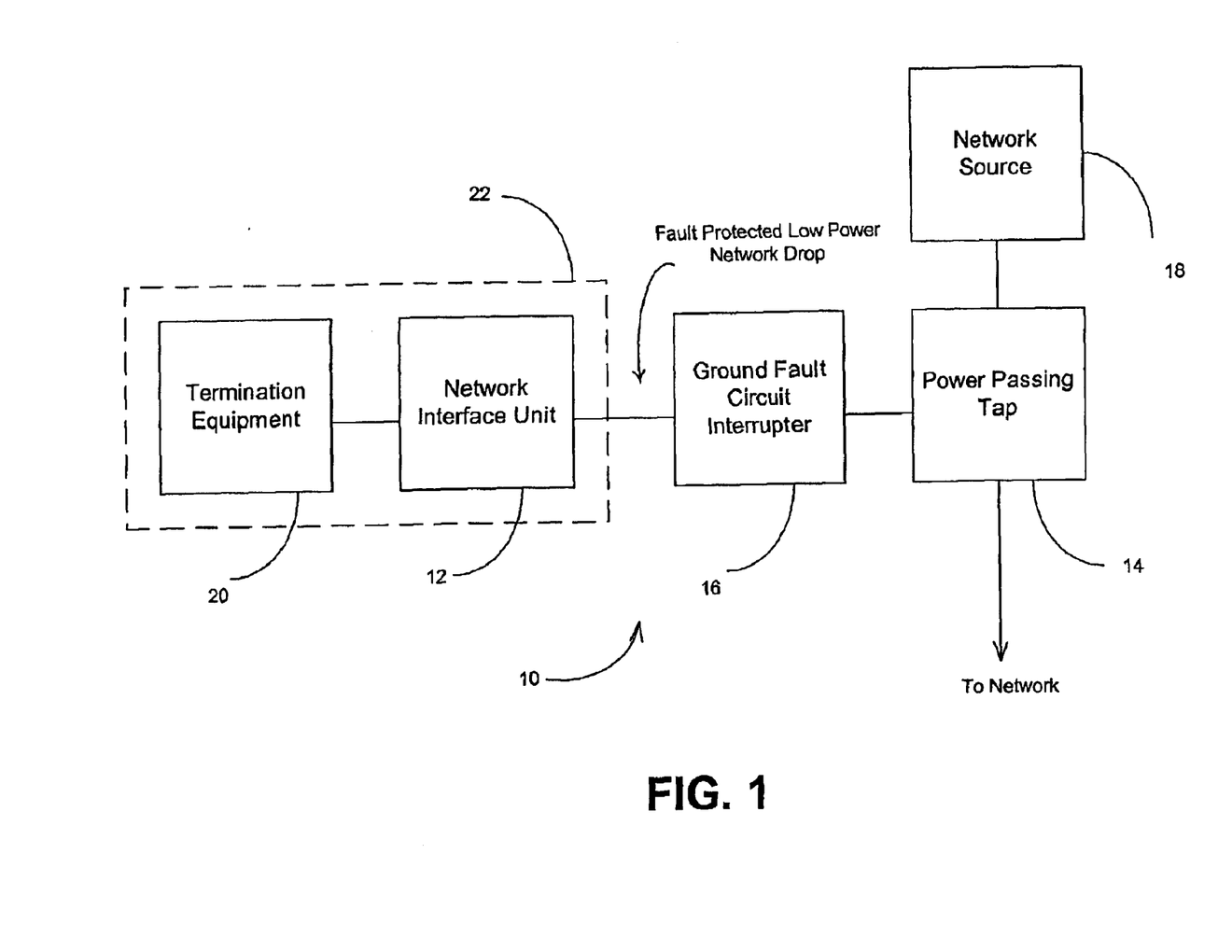
FIG. 1 is an exemplary block diagram of a portion of a Broadband Communication Network including a NIU with a power-passing tap.

Turning now to the figures, FIG. 1 illustrates an exemplary block diagram of a system 10 used in a Broadband Communication Network to provide a single point solution for protecting personnel against electric shock resulting from a ground fault along a drop cable. The system 10 includes a NIU 12 and a power-passing tap 14. The power-passing tap 14 connects to the Network Power Source 18 that provides power to the Network. A Ground Fault Circuit Interrupter ("GFCI") device 16 connects to the NIU 12 and the power-passing tap 14. The line between the GFCI circuit 16 and the NIU 12 is a fault-protected low-power-network drop.

The system 10 shown in the figure shows the power passing tap 14 being separate from GFCI device 16. Such an arrangement can provide fault protection functionality in an existing system where it may be undesirable to disturb existing components, such as the power passing tap 14, for example. Thus, a simple, low cost device comprising GFCI device 16 may be inserted in the drop line near the power passing tap 14 and the NIU 12.

However, it will be appreciated that in some scenarios, such as, for example, new construction, it may be more economical to install a single device that comprises a power passing tap and a GFCI device in one physical component. Therefore, it is noted that although the power passing tap 14 and the GFCI 16 are shown as separate components in FIG. 1, these components may be combined into a single component.

In system 10 shown in FIG. 1, the NIU 12 connects to the termination equipment 20 in the customer's premises 22. The GFCI device 16 may be designed using an integrated circuit device known in the art, such as the LM1851 Ground Fault Interrupter provided by National Semiconductor. The GFCI device 16 may be applied to taps providing center core power (power mixed with a radio frequency signal ("RF") over the same coaxial cable) as well as those providing Siamese power (power provided separately from RF over a twisted pair). The termination equipment 20 can be a device such as a personal computer, telephone or television, etc. GFCI device 16 is based on devices that are established as providing an acceptable means of protection from electric shock by 120 VAC household circuits. Accordingly, application of this technology to Low Power Broadband Communications Networks (<100 VAC) will provide the same level of protection.

The GFCI device 16 provides protection from faults between "hot" (center conductor of coax) and earth ground. This type of fault is representative of someone encountering a broken or disconnected cable and forming a current path through his or her body to ground. The circuit detects the current flow at very low levels and typically disconnects the power within milliseconds to prevent a hazardous condition. Grounded Neutral Faults (or neutral-ground) are faults where the neutral becomes shorted to earth ground. This type of fault is representative of a cut wire in which the neutral lead comes into contact with earth ground. While this condition in itself is not hazardous since neutral is connected to earth ground at the source, it usually indicates that the cable has been compromised and a condition exists which could lead to someone coming into contact with the hot lead. This type of fault is usually not detected in the center core power scheme because the typical configuration of that powering scheme directly connects neutral to earth ground at the NIU. However, Grounded Neutral Faults may be detected in the Siamese powering scheme.

While Grounded Neutral Faults may not be detectable on center core powered drops, safety is not compromised. Because the coaxial cable used for this type of drop has the hot lead in the center of the cable surrounded by the neutral conductor around the perimeter, the likelihood is high that a cable cut will produce a normal fault (hot-to-ground) as the cut is made.

A current limiting device, which would typically already exist in power passing tap 14 where only GFCI device 16 is being retrofitted into an existing system, provides protection against electrical short circuits within components of the system 10. The addition of the GFCI circuit protects against electric shock by detecting faults that occur when a human, or animal, standing on the ground comes in contact with an exposed hot conductor, such as the center conductor of a coaxial cable in a center core powering scheme, although open circuits may not be detected. Accordingly, the circuit provides a level of protection that has been accepted as adequate for similar hazardous situations, such as might occur in connection with outdoor outlets, bathrooms or kitchens, where the electrical resistance between a human and the ground is low due to the presence of water.

Figure 2:
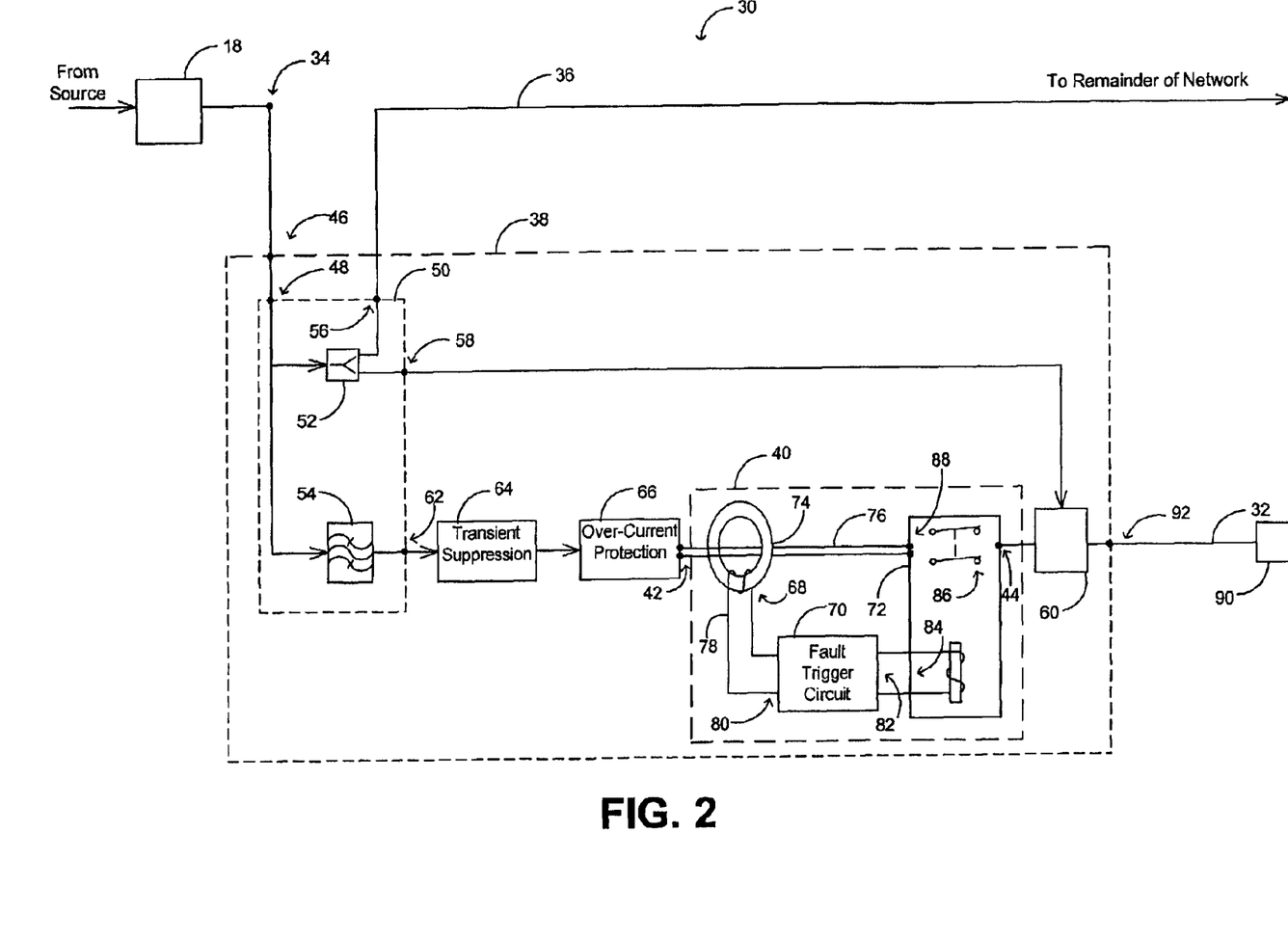
FIG. 2 is an exemplary schematic diagram of a system incorporating a power-passing tap that includes fault protection means used in a center-core powering scheme.

Referring now to FIG. 2, a system 30 is shown for providing fault protection for drop cable 32 at a location physically proximate to the point where the tap point 34 for the drop is located. This physical location will typically be on a pole at the height that the network cable 36 is attached as it spans from pole to pole, but may be an alternative height as required by the particular installation. The system 30 includes a combination power-passing tap 38, which combines a power passing tap and a GFCI device for providing the fault protection required by NEC 830. As discussed above, it will be appreciated that the power passing tap and the GFCI device may or may not be mounted and enclosed within the same physical component.

Thus, as illustrated, combination power-passing tap 38 may be a stand-alone device that combines power-passing properties of a power-passing tap that is known in the art, with fault protection features. A tap, such as one shown by combination-power-passing tap 38, provides a one-device solution to the fault protection problem, and will be beneficial in new-installation scenarios where an existing power-passing tap in not already in use. Where a power-passing tap 14 as shown in FIG. 1 already exists in an installation, GFCI component 16 alone may find wider use, as the cost of stand-alone GFCI 16 may be less than the cost of combination-power-passing tap 38 as shown in FIG. 2. Regardless of whether the fault protection device is a separate device, such as GFCI device 16 installed into an existing system as shown in FIG. 1, or is part of a combination power-passing tap 38 installed into a new system configured as depicted by system 30 as shown in FIG. 2, the fault protection component circuitry is similar.

Still referring to FIG. 2, the fault protection function is provided by fault protection circuitry 40, which is designed to sense a fault condition on drop cable 32 and interrupt the transmission of AC power thereby. The fault protection circuit 40 receives incoming AC power at input 42 and outputs AC power at output 44. Before AC power is inputted to the fault protection circuit 40, the signal that carries AC power and RF power is conditioned after being received at an input 46 of the combination power-passing tap 38.

After a signal has been received at input 46, the signal is routed to input 48 of filter means 50. The preferred filter means 50 comprises a circuit that is designed to separate RF power and AC power. To accomplish the separation of RF and AC power, the circuitry of the preferred filter means 50 is designed to provide two primary functions. A signal received at input 48 of the filter means 50 is applied to a splitter 52 and to a low pass filter 54. The splitter 52 splits the signal received at input 48 into an RF signal with the AC power removed, and a substantially unadulterated combined RF and AC power signal. The combined RF and AC power signal is then passed through the splitter and outputted at output 56.

The splitter 52, known in the art to remove the AC power component from the combined RF and AC power signal, provides high pass filtering functionality. However, it will be appreciated that a discrete high pass filter circuit may not need to be specifically designed, as the splitter means 52 typically removes low frequencies due to an inherent high pass transfer function. The high frequency signal, having had the AC power removed by the high pass characteristic of the filtering means, is then outputted at RF signal output 58 and routed to combiner 60. Combiner 60 combines the RF signal from output 58 with the AC power signal as will be discussed later in this description of FIG. 2.

Before the AC power signal is combined with the RF signal by combiner 60, it is outputted from the low pass filter means 54 at output 62. From there, the AC power signal is passed through a transient suppression means 64, such as, for example an MOV circuit known in the art, that shunts the signal to ground when a predetermined voltage limit is exceeded. Then the AC power signal passes through an over-current protection means 66, such as, for example, a circuit breaker to protect the system from a short between hot and neutral. Both the transient suppression means 64 and the over-current protection means 66 are known in the art.

After the AC power signal has passed through the transient suppression means 64 and the over-current protection means 66, it enters the fault protection circuitry 40. The fault protection circuit 40, while comprising many varied components, primarily comprises three main components. These are a sensing means 68, such as, for example, a transformer, a triggering means 70, such as, for example, a GFCI controller circuit and an interruption means 72, such as for example, a relay.

The sensing means 68 may be, for example, a current transformer that has a core 74 that surrounds an AC power pass-through conductor 76, which functions as the transformer's primary. AC power pass-through conductor 76 may be any type of multi-conductor arrangement suitable for transmitting the AC power used in system 30, and will preferably be, for example, traces on a printed circuit. Since core 74 inductively couples transformer 68 to conductor 76, the transformer merely senses a net current flow in the conductor, without electrically impeding or altering the AC power flowing in the conductor. Thus, there is no $I^2R$ loss due to the sensing means 68. Moreover, the sensing means 68, therefore, does not introduce noise in any significant amount into the pass-though conductor 76.

It will be appreciated that although FIG. 2 shows most of the electrical paths as single line, the single lines generally represent at least two conductors, such as, for example, two circuit board traces or the center core conductor and shield of a coaxial cable. However, AC power pass-through conductor 76 is represented as two conductors to highlight the fact that core 74 senses a net current in the two conductors. For instance, if each of the two conductors of pass-through conductor 76 carries a current equal in magnitude to that carried by the other, but the current in each flows in a direction opposite to that of the other, then a current is not induced in the sense transformer 68. This is because the net current of the two conductors of the AC pass through-conductor 76 is zero.

If the transformer 68 senses any net current flow in pass-through conductor 76, a current is induced in the secondary 78 of transformer sensing means 68. Any current induced in secondary 78 is outputted to the input 80 of the trigger means 70. Trigger means 70 may comprise a ground fault interrupter circuit based on an integrated circuit known in the art, such as, for example, LM1851, which is manufactured by National Semiconductor Corporation.

If the trigger means circuit 70 detects a current at its input 80, a trigger signal is output at trigger output 82. Preferably, a trigger signal is only output at trigger output 82 when the current at input 80 exceeds a predetermined threshold. The trigger signal is received by interrupter means 72 at interrupter trigger input 84. When the trigger signal is received by the interrupter relay means 72, the trigger signal is routed to a primary of the relay means, which causes normally closed relay contacts 86 to open. This opening of contacts 86 breaks continuity between AC power input 88 and AC power output 44. Thus, continuity between the pass-through conductor 76 and the combiner 60 is broken, thereby removing AC power from drop cable 32. Combiner 60 is any means, known in the art, for combining the AC power, typically a 60 Hz power signal, with an RF signal, without noticeably adulterating the AC power signal or the RF signal.

Accordingly, the power-passing tap 38 of system 30 provides an effective means of removing from drop cable 32 AC power received in a signal that includes RF power, without noticeably altering either the RF signal or the AC power component that is transmitted to a CPE. Furthermore, the power-passing tap is functional with a wide variety of sources 18 and CPE devices 90. This is because system 30 splits the RF and AC power before the AC power is passed through the fault protection circuitry 40, and recombines the RF signal and the AC power component before the combined signal is outputted from the power-passing tap 38 at output 92. Moreover, power-passing tap 38 provides this functionality without materially altering the combined signal between input 46 and output 92 (unless, of course, a fault occurs along cable 32). Therefore, an advantage is provided over existing products, which must be reconfigured based on the specific source signal and CPE used.

Moreover, the sensing means is inductively coupled to AC power pass-through conductors 76, instead of being electrically connected to the system circuitry to measure DC voltage levels, as existing devices do. Since a transient at the CPE causes opposing currents of equal magnitudes in the AC power pass-through conductors, a current is not induced in the sensing transformer 74. Accordingly, a transient load at the CPE does not cause the trigger means 70 to operate. This is advantageous over existing systems that either trip on transients from a CPE, or have decreased fault sensitivity.

Figure 3:
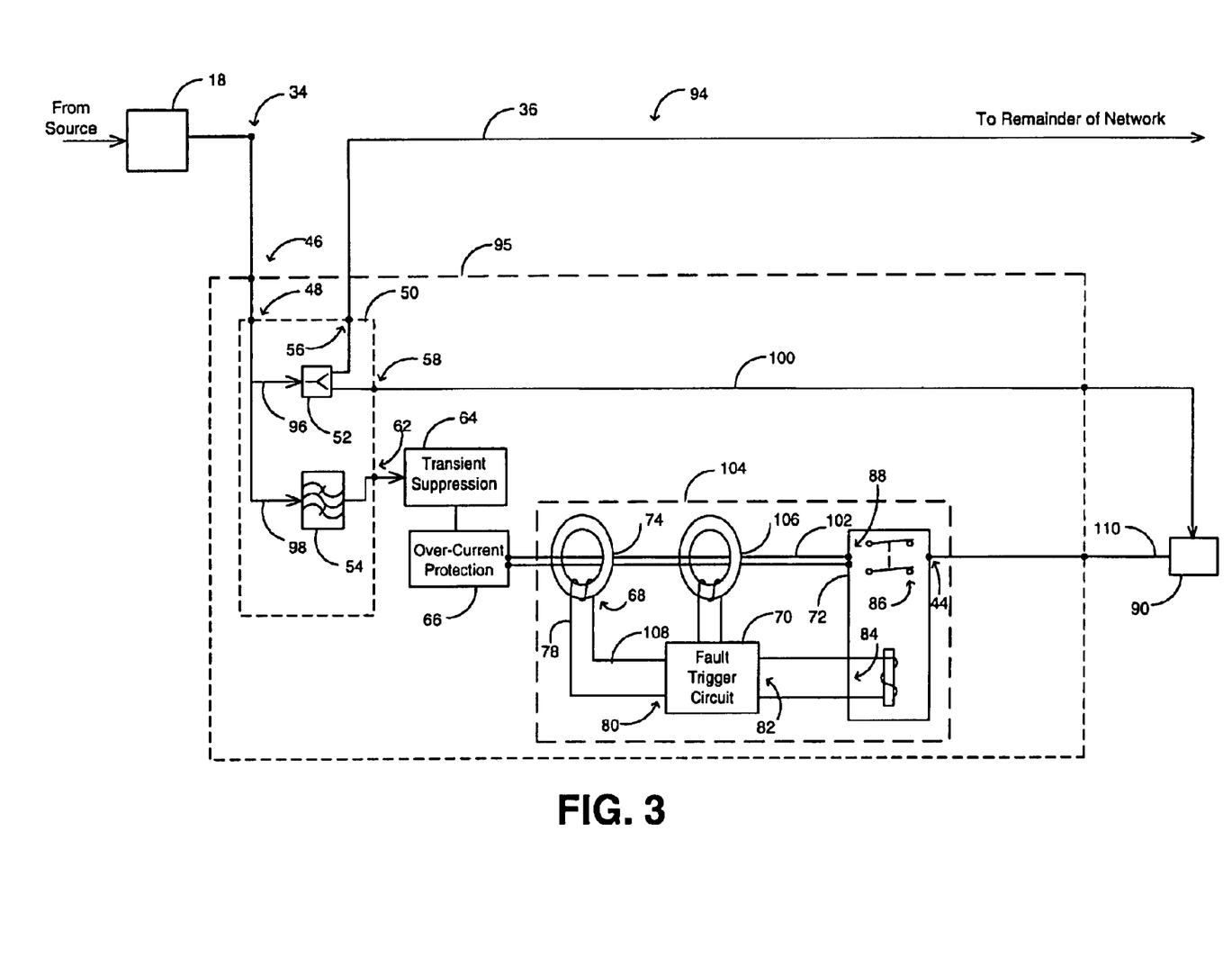
FIG. 3 is an exemplary schematic diagram of a system incorporating a power-passing tap that includes fault protection means used in a Siamese powering scheme.

Turning now to FIG. 3, a system is illustrated for providing fault protection in a low power CATV network 94, where the AC power is transmitted on separate conductors than the RF power on the drop from the tap to the CPE. However, the remainder of the network transmits the AC power and the RF power simultaneously on the same conductors. An example of such a system is known in the art as a Siamese powering scheme system. In a Siamese powering system, RF signal power is typically transmitting on coaxial cable, but the AC power is typically transmitted on a twisted pair cable. The system 94 shown in FIG. 3 is similar to the system 30 shown in FIG. 2, with modifications that facilitate the Siamese powering scheme. In system 94 shown in FIG. 3, the cable coming from source 18 is represented as a single line as it passes through tap point 34, the input 46 of Siamese power passing tap 95 and filter means input 48.

However, it will be appreciated that this single line depiction is made for purposes of simplifying the drawings, as the cabling from power source 18 will typically comprise, for example, a coaxial cable having two conductors. Furthermore, coaxial cabling will typically provide a combined power signal to splitter means 52 and to low pass filtering means 54.

Accordingly, a combined power signal having the RF signal and the AC power signal is output from the filter means 50 at output 56. The signal at output 56 is transmitted by cable 36 to the remainder of the network. An RF signal is also output from the filter means 50 at output 58, for transmission by subscriber RF cable 100 to the CPE equipment 90. This differs from the center-core powering scheme shown in FIG. 2 in that the subscriber RF cable 100 shown in FIG. 3 does not connect to a combiner before being passed to the CPE 90.

Still referring to FIG. 3, cable 98 provides AC power to low pass filter 54, and the signal path from filter means output 62 through the transient suppression component 64 and the over-current protection means 66 to its output is similar to the path through the same components shown in FIG. 2.

However, as illustrated in FIG. 2 with respect to pass-through conductor 76, the detection circuit pass-through conductor 102 is a pair of conductors, as shown in FIG. 3 by the two-line representation. Conductor pair 102 connects the output of the over-current protection means to the inputs 88 of the relay 72, which are components of fault protection means 104.

Fault protection means 104 is configured to provide neutral-to-ground fault protection in addition to hot-to-ground fault protection in a Siamese powering scheme. This additional functionality is accomplished by using voltage injection transformer 106. Instead of sensing a net current in conductor pair 102 as sensing transformer 74 does, voltage injection transformer 106 inductively injects a common mode voltage into each conductor of conductor pair cable 102. Injection transformer 106 receives an input signal from injection voltage outputs 108 of trigger controller circuit means 70. Thus, a voltage is placed on each conductor of conductor pair 102 with respect to ground, where the voltage on each conductor is equal to the voltage on the other. Accordingly, the common mode voltage does not produce a net current in cable 102 as long as a fault condition does not exist along twisted pair drop cable 110.

If a fault from neutral-to-ground occurs in drop cable 110 then the voltage injected by injection transformer 106 will cause a net current in conductor pair 102, which will be sensed by sense transformer 74. Additionally, if a hot-to-ground fault occurs, the net current will be sensed by sense transformer 68, as in system 30 illustrated in FIG. 2. This will signal the trigger means 70 that a fault condition has occurred; the trigger means will then trigger the interrupting means 72 to operate, thereby interrupting the transmission of AC power through pass-through conductor 102 and preventing a shock hazard on drop cable 110. Thus, in a Siamese powering scheme in a CATV network, for example, a net current will occur in conductor pair 102 if either the hot conductor or the neutral conductor of the drop cable 110 is shorted to ground. Thus, in response to such net current, fault protection means 104 will disconnect AC power being transmitted through conductor pair 102.

Figure 4:
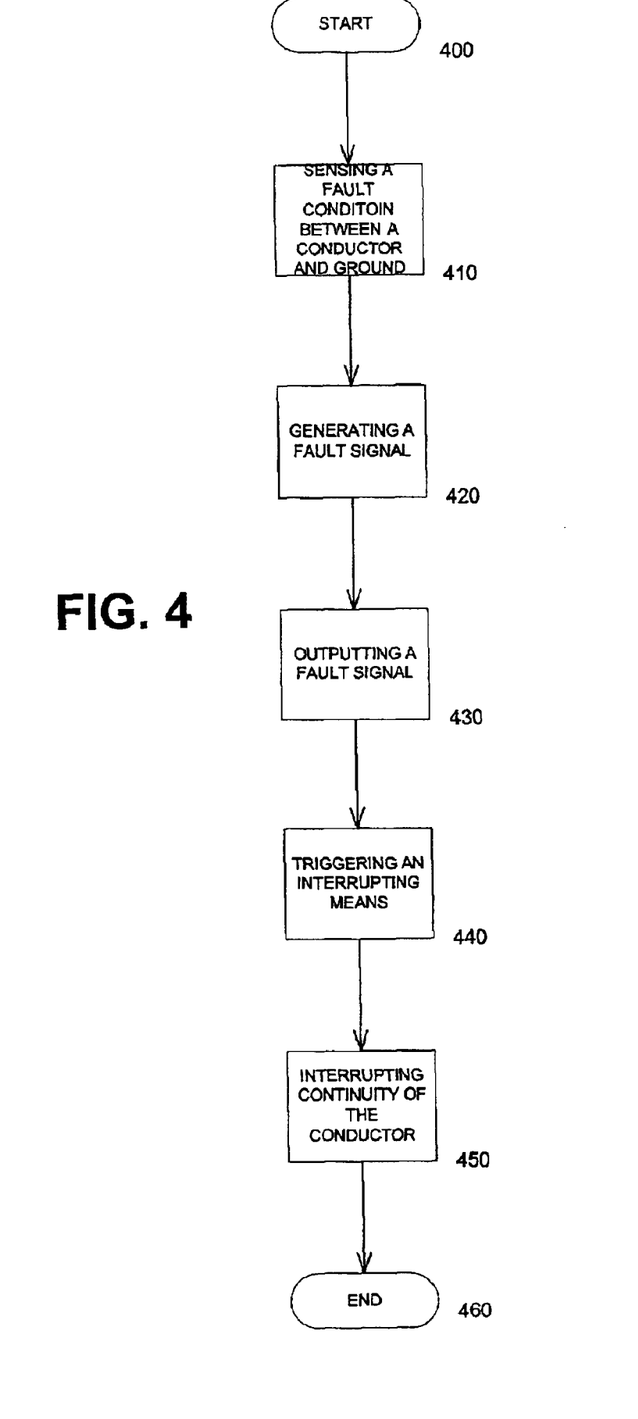
FIG. 4 illustrates the steps of a method for providing fault protection to a drop cable carrying AC power in a CATV network system.

Turning now to FIG. 4, the steps of a method are illustrated for providing fault protection to a conductor that carries AC power in a powered broadband network. The conductor will typically be a coaxial cable in a composite powered system or a twisted pair of conductors in a Siamese powered system. At step 400, the routine starts. Then, if a fault exists, it is sensed at step 410. A sense transformer, for example, typically senses the fault that is inductively coupled to conductors carrying the current that flows in the coaxial or twisted pair cable. These conductors may be, for example, traces on a printed circuit board, where the traces are part of a circuit that provides the fault protection, and that are electrically connected, in series with various other components, between a tap point and the drop cable carrying power to the CPE.

If a fault is sensed at step 410, the sense transformer generates a fault signal at step 420, and outputs the fault signal to a trigger means, such as a circuit based on the LM1851 circuit manufactured by National Semiconductor, at step 430. When the trigger means receives the fault signal at step 430, it outputs a trigger signal to an interrupting means at step 440. The interrupting means may typically be, for example, a relay. When the relay receives the trigger means, it opens at step 450 its secondary contacts, which are normally closed. These secondary contacts are connected electrically in series with the trace conductors between the tap and the drop cable carrying power to the CPE. When the relay contacts are opened at step 450, continuity between the tap point and the drop cable is broken and AC power in the drop cable is removed, thereby preventing the risk of electric shock that could occur if contact with the drop cable were made. After the power has been removed at step 450, the routine ends at step 460.

In view of the foregoing detailed description of the preferred embodiments of the present invention, it readily will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention.

Accordingly, while the present invention has been described herein in detail in relation to preferred embodiment, it is to be understood that this disclosure is only illustrative and exemplary of the present invention and is made merely for the purposes of providing a full and enabling disclosure of the invention. The foregoing disclosure is not intended nor is to be construed to limit the present invention or otherwise to exclude any such other embodiments, adaptations, variations, modifications or equivalent arrangements, the present invention being limited only by the claims appended hereto and the equivalents thereof.

I claim:

1. A device for providing fault protection to a cable drop in a center core powering scheme system having at least two conductors for transmitting high frequency electrical signals and AC power simultaneously, comprising:

means for splitting the high frequency electrical signals from the AC power signals and providing the separated signals at an RF signal output and AC power signal output;

interrupting means for interrupting the AC power from the splitter means in response to a trigger signal;

trigger means for outputting a trigger signal for operating the interrupting means from a normally closed position to an open position in response to a fault signal, the trigger means configured for receiving the fault signal at a sense input and further configured for outputting the trigger signal to the interrupting means from a trigger signal output;

sensing means for sensing a fault condition between either of the at least two conductors and ground, the sensing means coupled to the AC power signal output and having an output for electrically outputting the fault signal to a sense input of the trigger means; and combining means for combining the AC power signals and high frequency electrical signals received from the RF signal and AC power signal outputs.

2. The device of claim 1 wherein the interrupting means breaks electrical continuity in at least one of the at least two conductors.

3. The device of claim 2 wherein the interrupting means is a relay.

4. The device of claim 2 wherein the interrupting means is a spring-loaded switch.

5. The device of claim 2 wherein the interrupting means is a triac.

6. The device of claim 2 wherein the interrupting means is an SCR.

7. The device of claim 1 wherein the trigger means is an SCR.

8. The device of claim 1 wherein the trigger means is a transformer.

9. The device of claim 1 wherein the sensing means includes a sense transformer, said transformer being inductively coupled to said at least two conductors.

10. The device of claim 9 wherein the sense transformer further comprises a core that physically surrounds said at least two conductors for inductively coupling said transformer to said at least two conductors, said transformer further comprising a secondary that is inductively coupled to said care for providing an output signal in response to current in the primary.

11. The device of claim 10 wherein the trigger means includes a detection circuit, said detection circuit having an input being electrically connected to a secondary output of the sense transformer, said detection circuit further having an output electrically connected to the input of the interrupter means.

12. The device of claim 11 wherein the detection circuit is configured to output a trigger signal to the interrupter means if the input from the transformer secondary exceeds a predetermined threshold.

13. A system for providing fault protection to a cable having at least two conductors used for transmitting high frequency electrical signals and AC power simultaneously between a powered broadband communications network drop point and at least one destination device, comprising:

a filter means having an input electrically connected to the drop point via the at least two conductors, the filter means configured to block the AC power and pass the high frequency electrical signals from a high frequency output, the filter further configured to pass the AC power from a low frequency output;

at least one fault protection device having an input and an output, the input of said fault protection device being electrically connected to the low pass output of the filter means;

at least one combiner for combining a high frequency signal and an AC power signal into a combined signal and outputting the combined signal from a combined signal output to the at least one destination device, the high frequency signal being received at a high frequency input of the combiner from the filter means' high frequency output, and the AC power signal being received at a low frequency input of said combiner from the fault protection device's output; and said at least one fault protection device being electrically located between the drop point and the at least one destination device, said at least one fault protection device further being physically located proximate the drop point.

14. The system of claim 13 wherein the fault protection device comprises a sensing means for sensing a fault condition between either of the at least two conductors and ground, the sensing means further comprising a transformer, said transformer being inductively coupled to the at least two conductors, which are the primary of the transformer.

15. The system of claim 14 wherein the transformer further comprises a core, said core being inductively coupled to the at least two conductors and a secondary that provides an output signal proportional to current in the at least two conductors.

16. The system of claim 15 wherein the fault protection device further comprises a trigger means, the trigger means including a detection circuit having an input being electrically connected to the secondary outputs of the transformer.

17. The system of claim 16, the detection circuit being further configured to provide an output trigger signal if the input from the transformer secondary exceeds a predetermined threshold.

18. The system of claim 17 wherein the filter means, the fault protection device and the combiner are mounted in the same enclosure.

19. The system of claim 13 wherein the system outputs the combined signal to a plurality of destination devices from a plurality of corresponding combiners, the system further comprising a plurality of fault protection devices, the input of each said fault protection device being electrically connected to the low frequency output of the filter means, the system further comprising a splitter configured to receive a combined power signal, the splitter further configured with a plurality of outputs, each said splitter output configured to provide the high frequency electrical signal to a high frequency input of one of the plurality of said combiners.

20. A method for providing fault protection to a cable having at least two conductors used for transmitting high frequency electrical signals and AC power simultaneously, comprising:

separating the AC power signal from the high frequency electrical signals;

providing the separated AC power signal to a sensing means;

sensing a fault condition between one of the at least two conductors and ground with sensing means coupled to, but not electrically connected to, the at least two conductors;

generating a fault signal based on the sensing of a fault condition by the sensing means;

outputting the fault signal to a trigger means, thereby instructing a trigger means to operate;

triggering a normally closed interrupting means to interrupt continuity of at least one of the at least two conductors in the cable in response to the outputted fault signal;

interrupting continuity of at least one of the at least two conductors in the cable with the interrupting means based on the fault signal output; and combining the high frequency electrical signals and AC power signals for forwarding to a subscriber premise equipment device.

* * * * *